United States Patent
Ebersole

(10) Patent No.: US 7,996,416 B2
(45) Date of Patent: *Aug. 9, 2011

(54) PARAMETER TYPE PREDICTION IN OBJECT RELATIONAL MAPPING

(75) Inventor: Steven Ebersole, Austin, TX (US)

(73) Assignee: Red Hat, Inc., Raleigh, NC (US)

( * ) Notice: Subject to any disclaimer, the term of this patent is extended or adjusted under 35 U.S.C. 154(b) by 385 days.

This patent is subject to a terminal disclaimer.

(21) Appl. No.: 11/849,066

(22) Filed: Aug. 31, 2007

(65) Prior Publication Data

US 2009/0063435 A1    Mar. 5, 2009

(51) Int. Cl.
*G06F 7/00* (2006.01)

(52) U.S. Cl. ........ 707/759; 707/760; 707/761; 707/762; 707/763; 707/765

(58) Field of Classification Search ................. 707/102, 707/759–763, 765
See application file for complete search history.

(56) References Cited

U.S. PATENT DOCUMENTS

| | | | |
|---|---|---|---|
| 5,548,749 A | 8/1996 | Kroenke et al. | |
| 5,555,403 A | 9/1996 | Cambot et al. | |
| 5,864,843 A | 1/1999 | Carino, Jr. et al. | |
| 6,263,328 B1 | 7/2001 | Coden et al. | |
| 6,353,816 B1 | 3/2002 | Tsukimoto | |
| 6,460,043 B1 | 10/2002 | Tabbara et al. | |
| 7,130,863 B2 | 10/2006 | Diab | |
| 7,272,586 B2 | 9/2007 | Nauck et al. | |
| 7,296,028 B1 | 11/2007 | Ivanova | |
| 7,398,268 B2 | 7/2008 | Kim et al. | |
| 7,516,103 B1 | 4/2009 | Peitrucha, Jr. et al. | |
| 7,552,135 B2 | 6/2009 | Iyer et al. | |
| 2006/0010110 A1* | 1/2006 | Kim et al. ......... | 707/3 |
| 2006/0010142 A1 | 1/2006 | Kim et al. | |
| 2006/0012393 A1 | 1/2006 | Raju Datla et al. | |
| 2006/0013217 A1 | 1/2006 | Datla et al. | |
| 2006/0031233 A1 | 2/2006 | Liu et al. | |
| 2006/0047646 A1 | 3/2006 | Maluf et al. | |
| 2006/0117000 A1 | 6/2006 | Lulu | |
| 2006/0149767 A1* | 7/2006 | Kindsvogel et al. ......... | 707/101 |
| 2006/0200438 A1 | 9/2006 | Schloming | |
| 2006/0218132 A1* | 9/2006 | Mukhin et al. .......... | 707/4 |
| 2007/0038596 A1 | 2/2007 | Pizzo et al. | |
| 2007/0219976 A1 | 9/2007 | Muralidhar et al. | |
| 2007/0226196 A1* | 9/2007 | Adya et al. ......... | 707/3 |
| 2007/0226203 A1 | 9/2007 | Adya et al. | |

(Continued)

OTHER PUBLICATIONS

Ashley J.S. Mills, "ANTLR", copyright 2005, The University of Birmingham, 32pp.

(Continued)

*Primary Examiner* — Tim T. Vo
*Assistant Examiner* — Gary Koo
(74) *Attorney, Agent, or Firm* — Lowenstein Sandler LLP

(57) ABSTRACT

Techniques for object relational mapping in database technologies are described herein. According to one embodiment, in response to a query statement for accessing a relational database, a syntax tree is generated to represent semantic information of the query statement, where the query statement includes a wildcard parameter and is implemented as an object of a SQL. A data type of the wildcard parameter is predicted based on the semantic information obtained from the syntax tree in view of a structure representing the syntax tree. The predicted data type of the wildcard parameter is used to access the corresponding entry of the relational database. Other methods and apparatuses are also described.

20 Claims, 7 Drawing Sheets

U.S. PATENT DOCUMENTS

| | | | |
|---|---|---|---|
| 2007/0244865 | A1 | 10/2007 | Gordon et al. |
| 2008/0065592 | A1 | 3/2008 | Doyle |
| 2008/0228697 | A1 | 9/2008 | Adya et al. |
| 2008/0319957 | A1 | 12/2008 | Muralidhar et al. |
| 2009/0006463 | A1 | 1/2009 | Mehra et al. |
| 2009/0037394 | A1 | 2/2009 | Nagarajan et al. |

OTHER PUBLICATIONS

Alberto Montresor, et al., "Jgroup Tutorial and Programmer's Manual", Feb. 2002, 53pp.

"PojoCache", User Documentation, Release 1.4.1 "Cayenne", 38pp.

ManikSurtani, et al., "JBoss Cache User Guide", A clustered, transactional cache, Release 2.0.0 Habanero, Jun. 2007, Copyright © 2004, 2005, 2006, 2007 JBoss, a division of Red Hat Inc., 92pp.

"Hibernate Tools", Reference Guide, Version: 3.2.0.beta9, 49pp.

"Hibernate Shards", Horizontal Partitioning with Hibernate, Version: 3.0.0.Betal, 20pp.

"Hibernate Search", Apache Lucene Integration, Version: 3.0.0.Betal, 22pp.

Hibernate Reference Documentation, Version: 3.2.2, 229pp.

Hibernate EntityManager, User Guide, Version 3.3.0.GA, 52pp.

Hibernate Annotations, Reference Guide, Version 3.3.0.GA, 58pp.

U.S. Appl. No. 11/849,099, office action mailed Oct. 15, 2009.

U.S. Appl. No. 11/849,099, Notice of Allowance mailed Apr. 26, 2010.

U.S. Appl. No. 11/849,099, Notice of Allowance mailed Sep. 9, 2010.

* cited by examiner

```
<ORM-mapping>
    <class
        name="aution.model.category"
        table="CATEGORY">

<id
            name="id"
            column="CATEGORY_ID"
            type="long">
            <generator class="native"/>

</id>
        <property
            name="name"
            column="NAME"
            type="string"/>

</class>
</ORM-mapping>
```

FIG. 3

PARAMETER TYPE PREDICTION IN OBJECT RELATIONAL MAPPING

TECHNICAL FIELD

The present invention relates generally to object relational mapping in database management. More particularly, this invention relates to improved data type prediction in object relational mapping.

BACKGROUND

Data management tasks in object-oriented programming are typically implemented by manipulating objects, which are typically non-scalar values. Consider the example of an address book entry, which represents a single person along with zero or more phone numbers and zero or more addresses. This could be modeled in an object-oriented implementation by a "person object" with "slots" to hold the data that comprise the entry: the person's name, a list (or array) of phone numbers, and a list of addresses. The list of phone numbers would itself contain "phone number objects" and so on. The address book entry is treated as a single value by the programming language (it can be referenced by a single variable, for instance). Various methods can be associated with the object, such as a method to return the preferred phone number, the home address, and so on.

Many popular database products, however, such as SQL DBMS products, can only store and manipulate scalar values such as integers and strings, organized within tables. A programmer must either convert the object values into groups of simpler values for storage in the database (and convert them back upon retrieval), or only use simple scalar values within the program. Object-relational mapping is used to implement the first approach.

Object-relational mapping (aka O/RM, ORM, and O/R mapping) is a programming technique for converting data between incompatible type systems in databases and object-oriented programming languages. This creates, in effect, a "virtual object database" which can be used from within the programming language.

Typically, a conventional ORM system provides an application programming interface (API) to allow a user to specifically set a data type of a parameter during mapping an object with a database entry. If a user enters a wildcard parameter such as "?" or "*", the conventional ORM is not able to determine the data type. Further, a boolean entry of an underlying database may be represented as a numeric value or a string. When a user sets a boolean value, the user has to specifically specify whether the boolean value is in a form of a numeric value or a string value. Otherwise, the conventional ORM system cannot handle the data type for the boolean parameter.

BRIEF DESCRIPTION OF THE DRAWINGS

The present invention is illustrated by way of example and not limitation in the figures of the accompanying drawings in which like references indicate similar elements.

FIG. 3 is pseudo code representing an example of metadata for object relational mapping.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
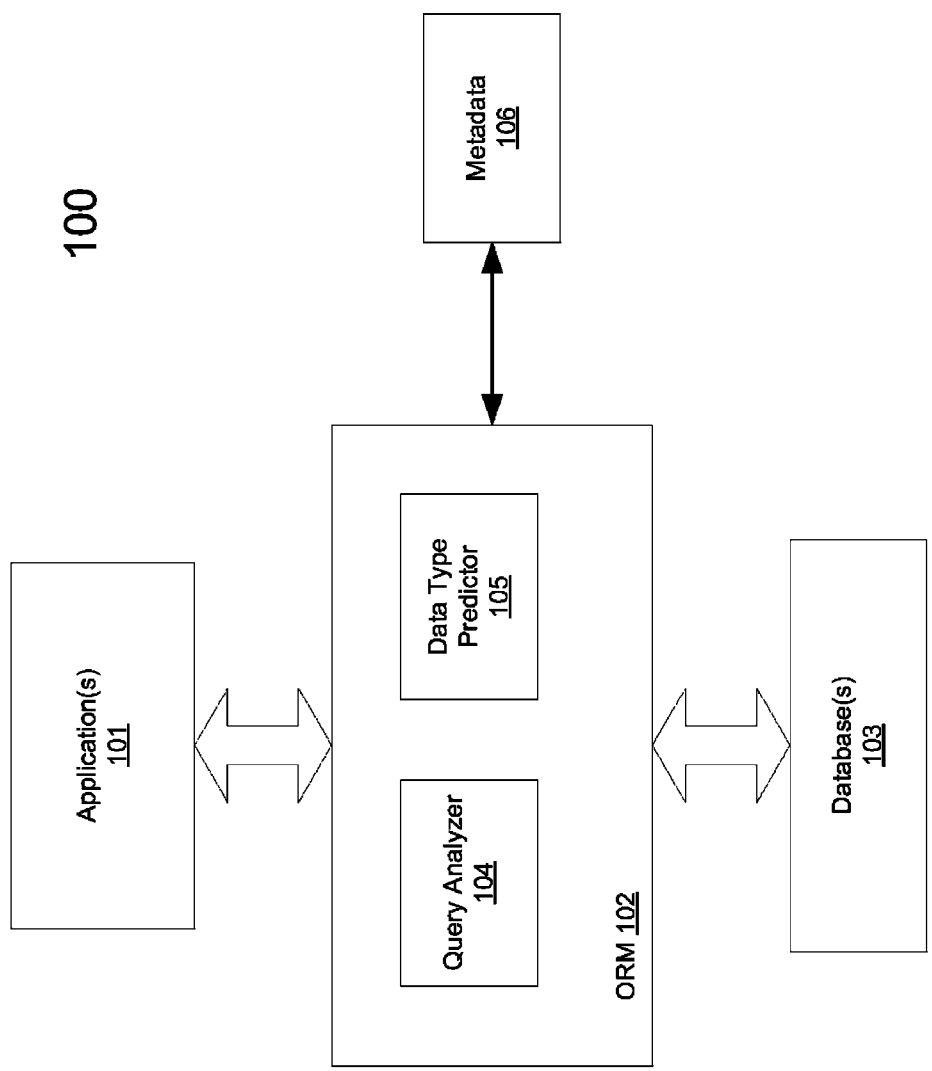
FIG. 1 is a block diagram illustrating an application framework which may be used with one embodiment of the invention.

FIG. 1 is a block diagram illustrating an application framework which may be used with one embodiment of the invention. Referring to FIG. 1, framework 100 includes, but is not limited to, an application client 101 accessing a database 103 through a common query API (application programming interface) 102 with object-relational mapping (ORM) features, also referred to as an ORM module. The API 102 provides the ability to map an object model's data representation to a relational data model and its corresponding database schema. For example, in a Java computing environment, the API 102 takes care of the mapping from Java classes to database tables and from Java data types to SQL (structured query language) data types used in a database. Note that throughout this application and for the purposes of illustration only, Java is used as an example of a cross-platform programming language. However, it is not so limited; other cross-platform programming languages may also be applied. The API 102 provides data query and retrieval facilities that reduce development time, which is designed to relieve a software developer from most of common data persistence-related programming tasks by reducing the need for manual, hand-crafted data processing using SQL and JDBC (Java database connectivity). The JDBC API is the industry standard for database-independent connectivity between the Java programming language and a wide range of databases—SQL databases and other tabular data sources, such as spreadsheets or flat files.

According to one embodiment, ORM 102 includes a query analyzer 104 and a data type predictor 105. The query analyzer 104, in response to a query, performs an analysis on the query to generate a syntax tree representing semantic information with respect to the query. Based on the syntax tree, the data type predictor 105 is configured to predict or guess the data type of certain parameters of the query. This is done without the application to specifically set the data type of the parameters. In a particular embodiment, data type predictor 105 may predict the data type of a Boolean parameter either in a numeric format or a string format dependent upon the requirement of the underlying database being accessed. In one embodiment, the data type predictor 105 may predict the data type based on metadata 106 that defines certain rules of mapping a specific object oriented programming object to a specific SQL of a particular database. An example of metadata is shown in FIG. 3 in an XML (extensible markup language) format.

In one embodiment, the query analyzer 104 includes a parser or translator generated using ANTLR (ANother Tool for Language Recognition) technologies. ANTLR allows one to define language grammars in either ANTLR syntax or a specific AST (abstract syntax tree) syntax. Further detailed information concerning ANTLR project can be found at ANTLR.ORG.

Figure 2:
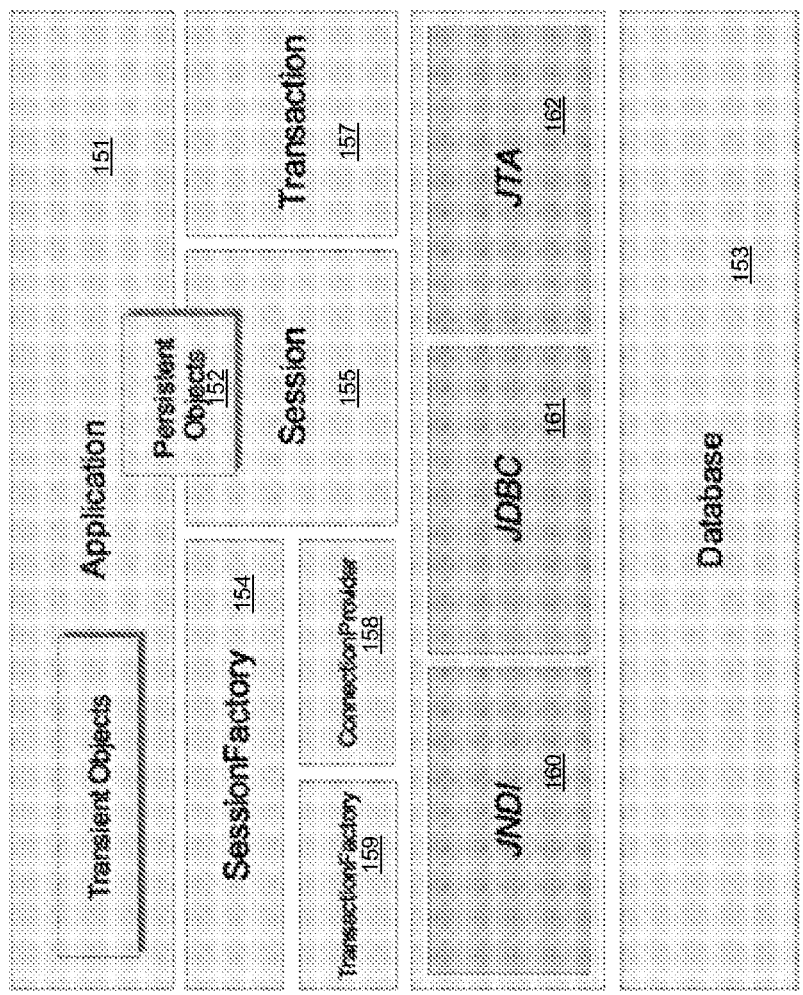
FIG. 2 is a block diagram illustrating an application framework according to an alternative embodiment of the invention.

FIG. 2 is a block diagram illustrating an application framework according to an alternative embodiment of the invention. Referring to FIG. 2, similar to framework 100 as shown in FIG. 1, framework 150 includes, but is not limited to, an application 151 accessing database 153 via an application framework 152 which may be implemented as part of framework 102 of FIG. 1. In this example, framework 152 is configured to provide persistent services to application 151.

Framework 152 includes a variety of components. For example, session factory 154 is configured to provide a thread-safe (immutable) cache of compiled mappings for a single database. Session factory 154 is a factory for session 155 and a client of connection provider 158 and it may hold an optional (e.g., second-level) cache of data that is reusable between transactions, at a process- or cluster-level. Session 155 is a single-threaded, short-lived object representing a conversation between the application 151 and the persistent store 153. Session 155 wraps a JDBC connection and is a factory for transaction 157. Session 155 holds a mandatory (first-level) cache of persistent objects, which are used when navigating an object graph or looking up objects based on an identifier.

Persistent objects 156 are short-lived, single threaded objects containing persistent state and business function. Persistent objects 156 may be ordinary JavaBeans/POJOs (plain old Java objects). Persistent objects 156 may be associated with a session (e.g., session 155). As soon as the associated session is closed, the persistent objects 156 will be detached and free to use in any application layer (e.g. directly as data transfer objects to and from presentation). Transaction 157 is a single-threaded, short-lived object used by the application to specify atomic units of work. Transaction 157 abstract applications from underlying JDBC (Java database connectivity), JTA (Java transaction API), and/or CORBA (common object request broker architecture) transactions. A session may span several transactions in some situations.

The JDBC API is the industry standard for database-independent connectivity between the Java programming language and a wide range of databases—SQL databases and other tabular data sources, such as spreadsheets or flat files. The JDBC API provides a call-level API for SQL-based database access. The JTA specifies standard Java interfaces between a transaction manager and the parties involved in a distributed transaction system, such as the resource manager, the application server, and the transactional applications. The CORBA is a standard defined by the Object Management Group (OMG) that enables software components written in multiple computer languages and running on multiple computers to interoperate. CORBA "wraps" program code into a bundle containing information about the capabilities of the code inside and how to call it. The resulting wrapped objects can then be called from other programs (or CORBA objects) across a network. CORBA uses an interface definition language (IDL) to specify the interfaces that objects will present to the world. CORBA then specifies a "mapping" from IDL to a specific implementation language like C++ or Java.

Referring back to FIG. 2, connection provider 158 is a factory for (and pool of) JDBC connections. Connection provider 158 abstracts application 151 from underlying data sources or driver managers (e.g., JNDI or Java naming and directory interface 160, JDBC 161, and JTA 162). Transaction factory 159 is a factory for transaction 157 instances. Framework 150 supports a variety of databases, including, for example, Oracle, DB2, Sybase, MS SQL server, MySQL, etc. In one embodiment, framework 150 further includes a query analyzer and a data type predictor as described above with respect to FIG. 1. Note that some or all of the components as shown in FIGS. 1-2 may be implemented in hardware, software, or a combination of both hardware and software.

Figure 4:
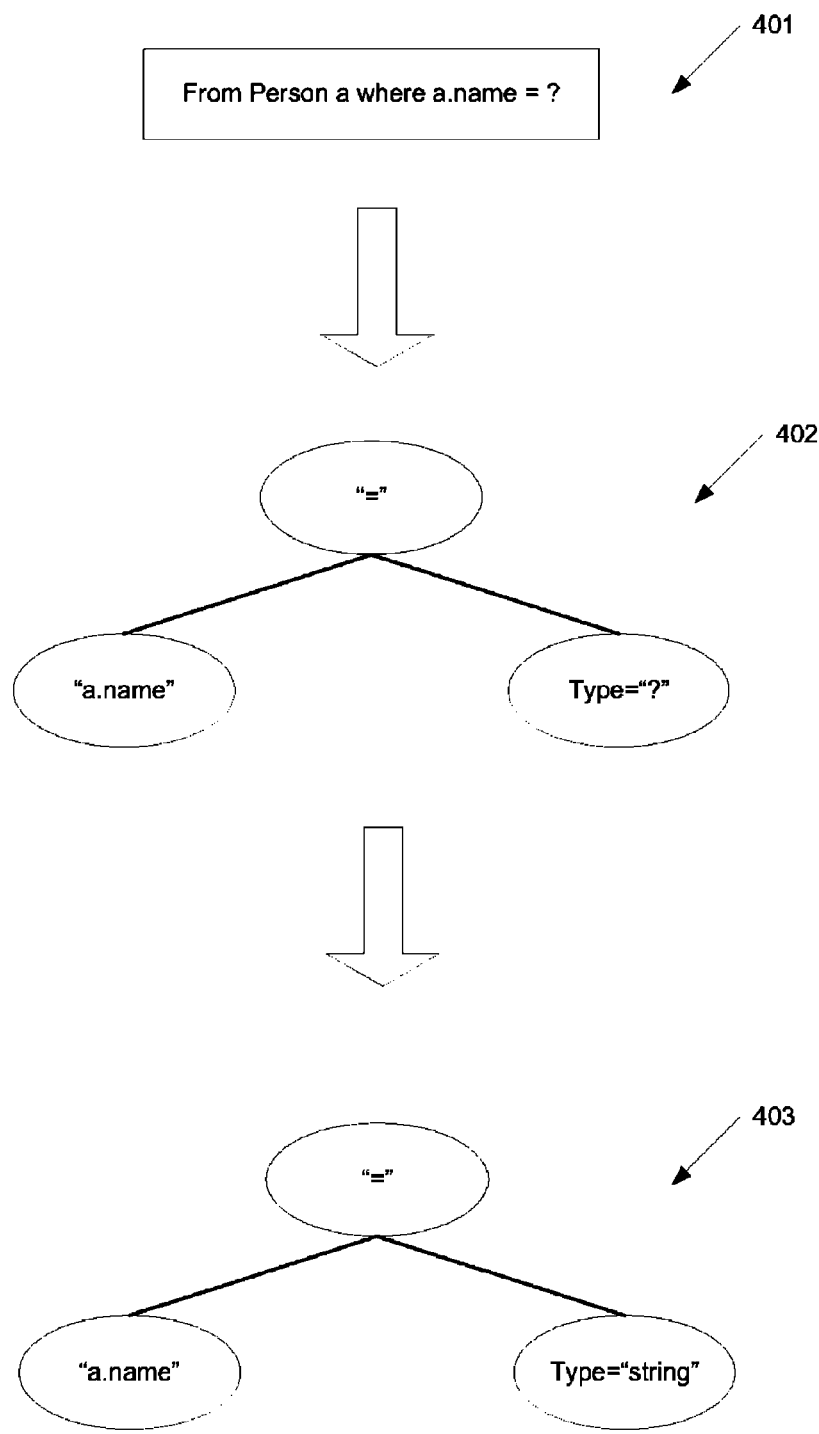
FIG. 4 is a diagram illustrating a process performed by a query analyzer according to one embodiment of the invention.

FIG. 4 is a diagram illustrating a process performed by a query analyzer according to one embodiment of the invention. Given a query statement or string 401, a conventional method is to call a specific method to set the parameter in which case the ORM unit interprets the parameter type. For example, the conventional method would have to use Query-.setParameter( ) method to set a particular parameter in which the ORM interprets the type of the parameter.

According to one embodiment, referring to FIG. 4, given a query statement 401, a query analysis is performed by a query analyzer, which may be generated using ANTLR techniques. As a result, a syntax tree structure 402 is generated, where the syntax tree 402 includes semantic information about the query statement 401. Based on the semantic information obtained from the syntax tree 402, the ORM unit can predict the missing data type of the parameter as shown in 403 and fill in the necessary information before accessing the underlying database.

In this example, given a query 401 of "from Person a where a.name=?" and the syntax tree 402, although the query statement does not provide the parameter type by only giving a wildcard "?", the ORM unit can predict that the parameter type is most likely the same as the underlying type of "Person.name" property which defines the object or class of "a", where the predicted parameter type may be a string as shown in syntax 403.

Figure 5:
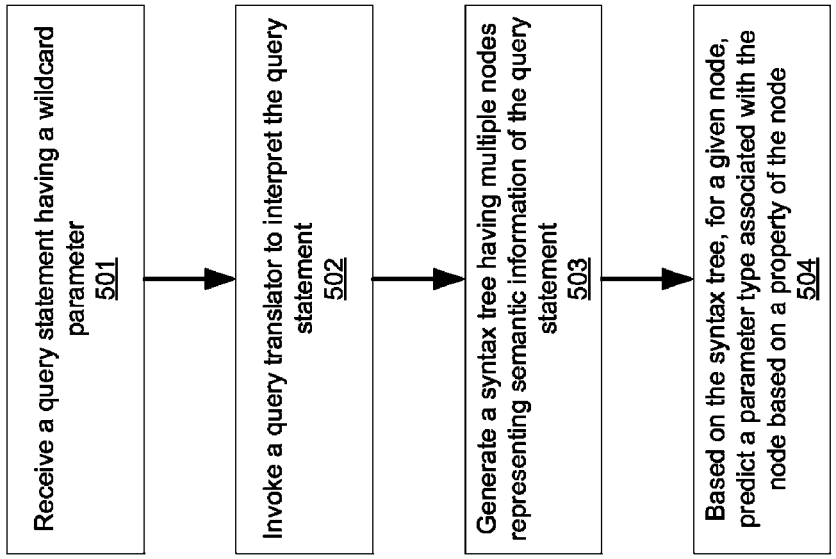
FIG. 5 is a flow diagram illustrating a process for predicting parameter type based on a syntax tree according to one embodiment.

FIG. 5 is a flow diagram illustrating a process for predicting parameter type based on a syntax tree according to one embodiment. Note that process 500 may be performed by processing logic which may include software, hardware, or a combination of both. For example, process 500 may be performed by system 100 as shown in FIG. 1. Referring to FIG. 5, at block 501, processing logic receives a query statement having a wildcard parameter. In response, at block 502, processing logic invokes a query translator or analyzer to interpret the query statement. At block 503, processing logic generates a syntax tree having multiple nodes representing semantic information of the query statement. Based on the syntax tree, at block 504, for a given node, processing logic predicts a parameter type associated with the node based on a property of the node. Other operations may also be performed.

In addition, the above techniques may also be used in certain situations to predict the data type of a Boolean parameter. For example, a Boolean value in a database technology may be represented as a numeric value such as a zero or non-zero value. However, a Boolean value may also be represented via a string such as "true" or "false", or other strings such as "yes" or "no". Whether a Boolean value is represented via a numeric number of a specific string depends on a specific implementation of the underlying database.

Conventionally, Boolean literals are used as an actual SQL construct, which allows a user to do a query as follows:

List pregs=session.createQuery ("from Animal a where a.pregnant=true").list( )

However, these are typically resolved to SQL literal values based on the dialect and are thus non-contextually resolved, for example, using a method similar to Dialet.toBooleanValueString( ). Using techniques similar to those described above, according to one embodiment, the Boolean literals may be resolved contextually. In the above example, the TRUE literal would be resolved to a SQL literal using the type associated with Animal.pregnent property.

Figure 6:
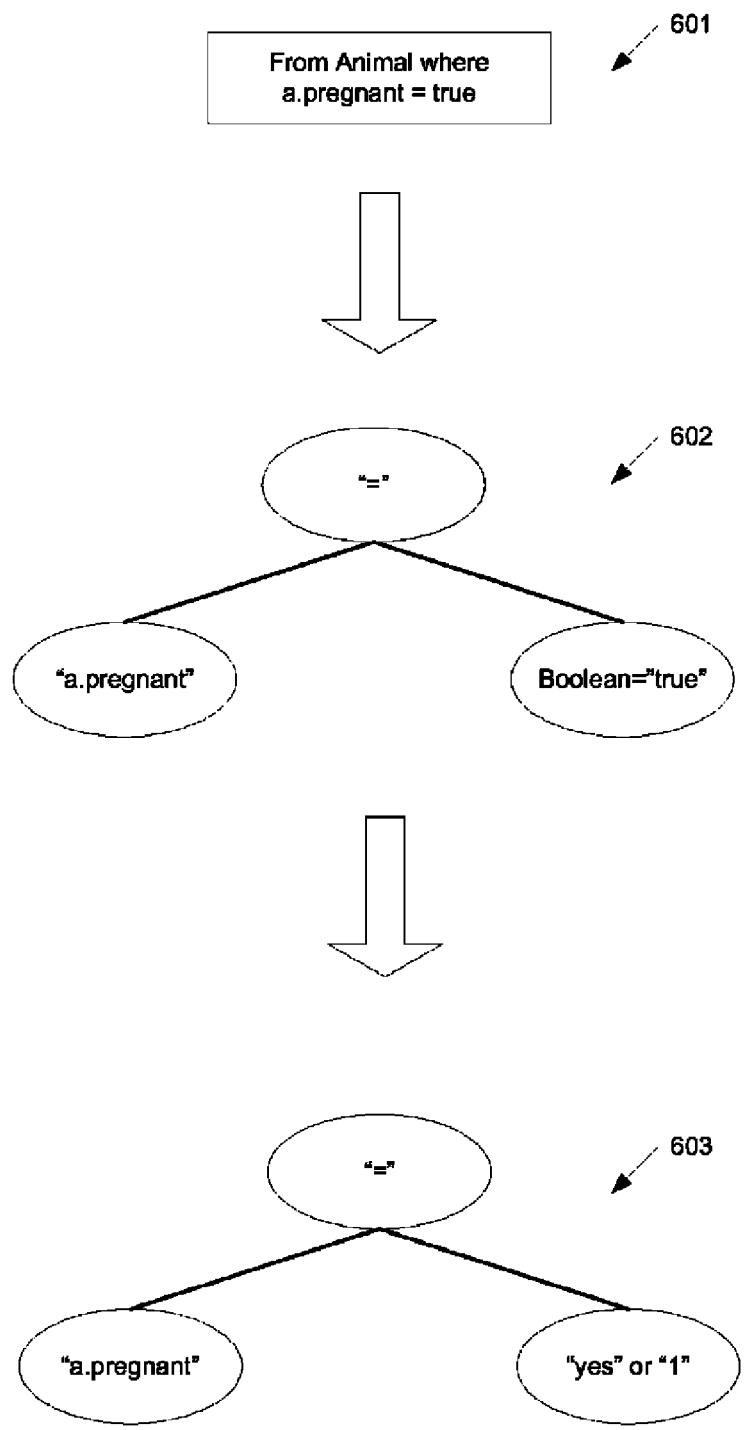
FIG. 6 is a diagram illustrating a process performed by a query analyzer according to one embodiment of the invention.

FIG. 6 is a diagram illustrating a process performed by a query analyzer according to one embodiment of the invention. Given a query statement or string 601, a conventional method is to call a specific method to set the parameter in which case the ORM unit interprets the parameter type. For example, the conventional method would have to use Dialet.toBooleanValueString( ) method to set a Boolean parameter type in which the ORM interprets the type of the parameter.

According to one embodiment, referring to FIG. 6, given a query statement 601, a query analysis is performed by a query analyzer, which may be generated using ANTLR techniques. As a result, a syntax tree structure 602 is generated, where the syntax tree 602 includes semantic information about the query statement 601. Based on the semantic information obtained from the syntax tree 602, the ORM unit can predict the missing Boolean data type of the parameter as shown in 603 and fill in the necessary information before accessing the underlying database.

In this example, given a query 601 of "from Animal a where a.pregnent=true" and the syntax tree 602, the ORM unit can predict that the parameter type is most like the same as the underlying type of "Animal.pregnant" property which defines the object or class of "a", where the predicted parameter type may be a string as shown in syntax 603. The type (e.g., either a numeric value or a string) used by the underlying database may be determined from the metadata, such as metadata as shown in FIG. 3, that maps the query to the specific SQL of the underlying database.

Figure 7:
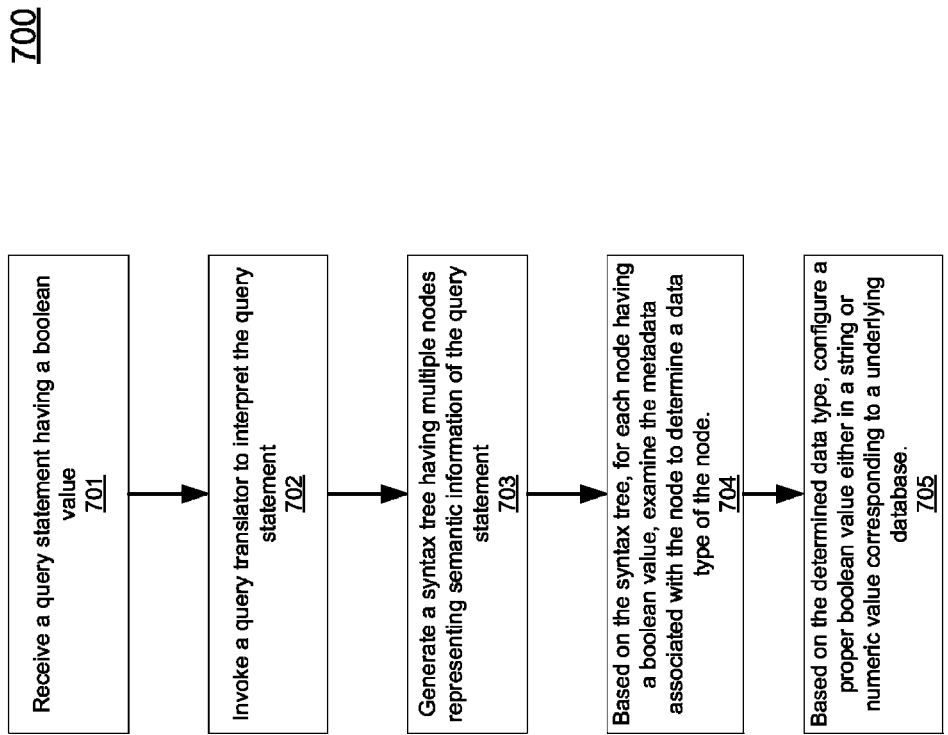
FIG. 7 is a flow diagram illustrating a process for predicting parameter type based on a syntax tree according to one embodiment.

FIG. 7 is a flow diagram illustrating a process for predicting parameter type based on a syntax tree according to one embodiment. Note that process 700 may be performed by processing logic which may include software, hardware, or a combination of both. For example, process 700 may be performed by system 100 as shown in FIG. 1. Referring to FIG. 7, at block 701, processing logic receives a query statement having a boolean parameter. In response, at block 702, processing logic invokes a query translator or analyzer to interpret the query statement. At block 703, processing logic generates a syntax tree having multiple nodes representing semantic information of the query statement. Based on the syntax tree, at block 704, for each node having a boolean value, processing logic examines the metadata associated with the node to determine a data type of the node. Based on the determined data type, at block 705, processing logic configures a proper boolean value either in a string or numeric value corresponding to a underlying database. For example, if a query has a boolean value of "true", after the analysis, the boolean value may be predicted and translated to a numeric value of "1" or another string of "yes", which corresponds to the data type of the underlying database. Other operations may also be performed.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method, comprising:
receiving, at an object-relational mapping (ORM) unit communicatively coupled to a relational database, a first structured query language (SQL) query statement for accessing the relational database, the first SQL query statement being received from a client application programmed in an object-oriented programming language, wherein the first SQL query statement is represented by a data object associated with the object-oriented programming language which is incompatible with a format of the relational database, and wherein the first SQL query statement includes a wildcard parameter that is not recognizable by the relational database;
generating, by a query analyzer of the ORM unit, a syntax tree representing semantic information of the first SQL query statement;
predicting, by a data type predictor of the ORM unit, a data type of the wildcard parameter based on the semantic information obtained from the syntax tree in view of a structure representing the syntax tree;
generating, by the object-relational mapping (ORM) unit, a second SQL query statement that is tailored to the format of the relational database, the second SQL query statement including a parameter representing the wildcard parameter of the first SQL query statement, wherein a data type of the parameter of the second SQL query statement is specified using the predicted data type; and
transmitting the second SQL query statement from the ORM unit to the relational database to access the relational database.

2. The method of claim 1, further comprising mapping the first SQL query statement with the predicted data type of the wildcard parameter to a corresponding data entry of the relational database based on metadata that defines a set of rules for mapping a query statement to one compatible with the format of the relational database.

3. The method of claim 2, further comprising performing a query analysis on the first SQL query statement to generate the syntax tree.

4. The method of claim 3, wherein the query analysis is configured to translate the first SQL query statement to a format compatible with the relational database.

5. The method of claim 4, wherein the first SQL query statement is translated by a query translator implemented using ANTLR (Another Tool for Language Recognition) compatible techniques.

6. The method of claim 5, wherein the data type of the wildcard parameter is predicted based on a property type of a corresponding property associated with the first SQL query statement.

7. The method of claim 5, wherein the metadata is in an extensible markup language (XML) format.

8. The method of claim 1, wherein the prediction of the data type is performed only if the parameter of the first SQL query statement is a wildcard parameter.

9. A machine-readable storage medium having instructions therein, which when executed by a processor, cause the processor to perform a method, the method comprising:
receiving, at an object-relational mapping (ORM) unit communicatively coupled to a relational database, a first structured query language (SQL) query statement for accessing the relational database, the first SQL query statement being received from a client application programmed in an object-oriented programming language, wherein the first SQL query statement is represented by a data object associated with the object-oriented programming language which is incompatible with a format of the relational database, and wherein the first SQL query statement includes a wildcard parameter that is not recognizable by the relational database;
generating, by a query analyzer of the ORM unit, a syntax tree representing semantic information of the first SQL query statement;
predicting, by a data type predictor of the ORM unit, a data type of the wildcard parameter based on the semantic information obtained from the syntax tree in view of a structure representing the syntax tree;
generating, by the object-relational mapping (ORM) unit, a second SQL query statement that is tailored to the format of the relational database, the second SQL query statement including a parameter representing the wildcard parameter of the first SQL query statement, wherein a data type of the parameter of the second SQL query statement is specified using the predicted data type; and
transmitting the second SQL query statement from the ORM unit to the relational database to access the relational database.

10. The machine-readable storage medium of claim 9, wherein the method further comprises mapping the first SQL query statement with the predicted data type of the wildcard parameter to a corresponding data entry of the relational database based on metadata that defines a set of rules for mapping a query statement to one compatible with the format of the relational database.

11. The machine-readable storage medium of claim 10, wherein the method further comprises performing a query analysis on the first SQL query statement to generate the syntax tree.

12. The machine-readable storage medium of claim 11, wherein the query analysis is configured to translate the first SQL query statement to a format compatible with the relational database.

13. The machine-readable storage medium of claim 12, wherein the first SQL query statement is translated by a query translator implemented using ANTLR (Another Tool for Language Recognition) compatible techniques.

14. The machine-readable storage medium of claim 13, wherein the data type of the wildcard parameter is predicted based on a property type of a corresponding property associated with the first SQL query statement.

15. The machine-readable storage medium of claim 13, wherein the metadata is in an extensible markup language (XML) format.

16. The machine-readable storage medium of claim 9, wherein the prediction of the data type is performed only if the parameter of the first SQL query statement is a wildcard parameter.

17. A data processing system, comprising:
a query analyzer, in response to a first structured query language (SQL) query statement for accessing a relational database, to generate a syntax tree representing semantic information of the first SQL query statement, the first SQL query statement being received from a client application programmed in an object-oriented programming language, wherein the first SQL query statement is represented by a data object associated with the object-oriented programming language which is incompatible with a format of the relational database, and wherein the first SQL query statement includes a wildcard parameter that is not recognizable by the relational database;

a data type predictor coupled to the query analyzer to predict a data type of the wildcard parameter based on the semantic information obtained from the syntax tree in view of a structure representing the syntax tree;

an object-relational mapping (ORM) unit coupled to the query analyzer and the data type predictor to generate a second SQL query statement that is tailored to the format of the relational database, the second SQL query statement including a parameter representing the wildcard parameter of the first SQL query statement, wherein a data type of the parameter of the second SQL query statement is specified using the predicted data type, and wherein the second SQL query statement is used to access the relational database.

18. The system of claim 17, wherein the ORM unit is configured to map the first SQL query statement with the predicted data type of the wildcard parameter to a corresponding data entry of the relational database.

19. The system of claim 18, wherein the query analyzer is configured to perform a query analysis on the first SQL query statement to generate the syntax tree.

20. The system of claim 19, wherein the query analyzer further comprises a query translator to translate the first SQL query statement a format compatible with the relational database.

\* \* \* \* \*